United States Patent [19]

Yagi et al.

[11] Patent Number: 6,130,783
[45] Date of Patent: Oct. 10, 2000

[54] OMNIDIRECTIONAL VISUAL SENSOR HAVING A PLURALITY OF MIRRORS WITH SURFACES OF REVOLUTION

[75] Inventors: Yasushi Yagi, 4-8, Ise-cho, Ashiya-shi, Hyogo; Masahiko Yachida, 41-8, Tsukaguchi-cho 6-chome, Amagasaki-shi, Hyogo, both of Japan

[73] Assignees: Sharp Kabushiki Kaisha, Osaka; Yasushi Yagi, Ashiya; Masahiko Yachida, Amagasaki, all of Japan

[21] Appl. No.: 09/311,275

[22] Filed: May 14, 1999

[30] Foreign Application Priority Data

May 14, 1998 [JP] Japan .................................. 10-172051

[51] Int. Cl.$^7$ ........................... G02B 27/10; G02B 13/22; G02B 5/08
[52] U.S. Cl. ........................... 359/627; 359/633; 359/850
[58] Field of Search .................................. 359/627, 648, 359/633, 850, 853, 856, 857, 728, 729, 730, 731

[56] References Cited

U.S. PATENT DOCUMENTS

| | | | |
|---|---|---|---|
| 3,505,465 | 4/1970 | Rees et al. | 348/36 |
| 4,395,093 | 7/1983 | Rosendahl et al. | 359/725 |
| 4,883,348 | 11/1989 | Spivey | 359/857 |
| 5,627,675 | 5/1997 | Davis et al. | 359/366 |
| 5,710,661 | 1/1998 | Cook | 359/364 |
| 5,760,826 | 6/1998 | Nayar | 348/36 |
| 5,854,713 | 12/1998 | Kuroda et al. | 359/850 |

OTHER PUBLICATIONS

"Omnidirectional Imaging with Hyperboloidal Projection", K. Yamazawa et al., Proceedings of the 1993 IEEE/RSJ International Conference on Intelligent Robots and Systems, Yokohama, Japan, Jul. 26–30, 1993, pp. 1029–1034.

"Reflecting Wide–Angle Optical System", A. Takeya et al., Annual Conference sponsored by the Society of Instrument and Control Engineers of Japan, Tokyo, Japan, Jul. 26–28, 1994, pp. 59–60.

*Primary Examiner*—Scott J. Sugarman
*Assistant Examiner*—Saeed Seyrafi
*Attorney, Agent, or Firm*—McDermott, Will & Emery

[57] ABSTRACT

An omnidirectional visual sensor which can observe a 360-degree panoramic field area, obtain a sharp image and correctly transform a central projection with respect to the image and can be minimized as a whole includes a convex mirror with a surface of revolution having a focal point, a plurality of mirrors with surfaces of revolutions having at least one focal point, a photoreceiving lens system receiving light reflected by the convex mirror with the surface of revolution and the plurality of mirrors with surfaces of revolutions and an image acquisition surface receiving the light received in the photoreceiving lens system and converting the same to an electric signal, and the convex mirror with the surface of revolution and the plurality of mirrors with surfaces of revolutions are so arranged that the focal point of a first mirror included in the convex mirror with the surface of revolution and the plurality of mirrors with surfaces of revolutions aligns with the focal point of a second mirror, included in the convex mirror with the surface of revolution and the plurality of mirrors with surfaces of revolutions, further reflecting light reflected by the first mirror.

4 Claims, 6 Drawing Sheets

OMNIDIRECTIONAL VISUAL SENSOR HAVING A PLURALITY OF MIRRORS WITH SURFACES OF REVOLUTION

BACKGROUND OF THE INVENTION

1. Field of the Invention

The present invention relates to a visual sensor for observing all directions, and more particularly, it relates to an omnidirectional visual sensor utilizing a mirror with a surface of revolution.

2. Description of the Background Art

Conventionally known omnidirectional visual sensor utilizing a mirror with a surface of revolution include a visual sensor utilizing a conical mirror, a spherical mirror, a hyperboloidal mirror or a paraboloidal mirror. Referring to FIG. 1, an omnidirectional visual sensor employing a hyperboloidal mirror includes a vertically placed hyperboloidal mirror facing downward and a camera vertically placed under the mirror facing upward. The hyperboloidal mirror (hyperboloid of two sheets) has a geometric property of having two focal points, and a certain geometrical relation holds between the two focal points and the hyperboloid thereof. When aligning the lens center of the camera with the first focal position of the hyperboloid, therefore, it is possible to form an optical system such that extension of light from an arbitrary point P in the environment necessarily passes through the second focal point B of the mirror regardless of the position thereof as shown in FIG. 1, i.e., a perspective transformation coordinate system. In other words, when setting the principal point of the photoreceiving lens system on the second focal point B of the hyperboloidal mirror, an image acquired in the omnidirectional visual sensor employing the hyperboloidal mirror can be readily transformed into a coordinate system having the first focal point C of the mirror as a temporary lens center. An omnidirectional visual sensor utilizing a conical or spherical mirror cannot perform such transformation.

Details related to a conventional omnidirectional visual sensor employing a hyperboloidal mirror are described in Yamazawa et al., "Omnidirectional Imaging with Hyperboloidal Projection", *Proceedings of the 1993 IEEE/RSJ International Conference on Intelligent Robots and Systems*, Yokohama, Japan, Jul. 26–30, 1993, and the description thereof is incorporated herein by reference.

An omnidirectional visual sensor utilizing a paraboloidal mirror exhibits a property similar to that of the hyperboloidal mirror under a certain condition. When a photoreceiving system allowing a parallel projection can be prepared for a convex paraboloidal mirror, the viewpoint is located on a single point similarly to the hyperboloid for enabling expression in a spherical coordinate system having the origin on this point. In the conventional study, however, a correct perspective transformation coordinate system cannot be implemented due to employment of a photoreceiving system such as an optical system having a long focal length or a telecentric lens approximately allowing a parallel projection.

Details related to a conventional omnidirectional visual sensor utilizing a paraboloidal mirror are described in U.S. Pat. No. 5,760,826, and the description thereof is incorporated herein by reference.

On the other hand, every mirror with a surface of revolution generally has a problem of blurring due to influence by astigmatism or the like, thus requiring close attention in design of the optical system. In general, it is difficult to reduce the influence by the astigmatism with a single mirror or lens, and a plurality of lenses must be combined with each other. In general, there has been proposed an optical system like a reflecting telescope utilizing two mirrors having optimum curvatures employing a method of acquiring a virtual image formed by a secondary mirror with a general telecamera through a primary mirror in the form of a two-dimensional torus in order to minimize the influence by the astigmatism.

The details thereof are described in Takeya et al., "Reflecting Wide-Angle Optical System", *Proceedings of Annual Conference sponsored by the Society of Instrument and Control Engineers (SICE)*, Tokyo, Japan, Jul. 26–28, 1994, and the description thereof is incorporated herein by reference.

However, the aforementioned omnidirectional visual sensor employing a hyperboloidal mirror has a problem of blurring due to influence by astigmatism or the like. Therefore, it is difficult to implement a small visual sensor which can transform a central projection while obtaining a sharp image by merely adjusting the shape of the hyperboloidal mirror and the optical system of the telecamera forming the photoreceiving system.

Further, it is hard to make the omnidirectional visual sensor utilizing a paraboloidal mirror smaller similarly to the omnidirectional visual sensor employing a hyperboloidal mirror, and it cannot correctly transform a central projection due to an approximate parallel projection by an optical system having a long focal length or a telecentric lens.

In addition, the aforementioned reflection wide-angle optical system cannot transform a central projection dissimilarly to the omnidirectional visual sensor employing a hyperboloidal mirror, although it can optimize the imaging system.

SUMMARY OF THE INVENTION

The present invention has been proposed in order to solve the aforementioned problems, and an object thereof is to provide an omnidirectional visual sensor which can simultaneously implement a correct central projection, optimization of an imaging system and miniaturization of the sensor itself.

An omnidirectional visual sensor according to an aspect of the present invention includes a convex mirror with a surface of revolution having a focal point, a plurality of mirrors with surfaces of revolutions having at least one focal point, a photoreceiving lens system receiving light reflected by the convex mirror with the surface of revolution and the plurality of mirrors with surfaces of revolutions and an image acquisition surface receiving the light received by the photoreceiving lens system and converting the same to an electric signal, and the convex mirror with the surface of revolution and the plurality of mirrors with surfaces of revolutions are so arranged that the focal point of a first mirror included in the convex mirror with the surface of revolution and the plurality of mirrors with surfaces of revolutions aligns with the focal point of a second mirror, included in the convex mirror with the surface of revolution and the plurality of mirrors with surfaces of revolutions, further reflecting light reflected by the first mirror.

A visual sensor capable of transforming a central projection and obtaining a sharp image can be implemented in a small size due to the aforementioned arrangement of the mirrors.

An omnidirectional visual sensor according to another aspect of the present invention includes a convex mirror with a surface of revolution having a focal point, a plurality of mirrors with surfaces of revolutions having at least one focal point, a photoreceiving lens system receiving light reflected by the convex mirror with the surface of revolution and the plurality of mirrors with surfaces of revolutions and an image acquisition surface receiving the light received by the photoreceiving lens system and converting the same to an electric signal, and the convex mirror with the surface of revolution and the plurality of mirrors with surfaces of revolutions are so arranged that a first mirror having only one focal point included in the convex mirror with the surface of revolution and the plurality of mirrors with surfaces of revolutions has the focal point on the side opposite to the reflecting surface of the first mirror, a second mirror, included in the convex mirror with the surface of revolution and the plurality of mirrors with surfaces of revolutions, having only one focal point and further reflecting light reflected by the first mirror has the focal point on the side opposite to the reflecting surface of the first mirror, and the rotation axis of the first mirror aligns with that of the second mirror.

The omnidirectional visual sensor can be minimized due to the aforementioned structure, and can correctly transform a central projection while the conventional omnidirectional visual sensor utilizing a paraboloidal mirror transforms an approximate central projection.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
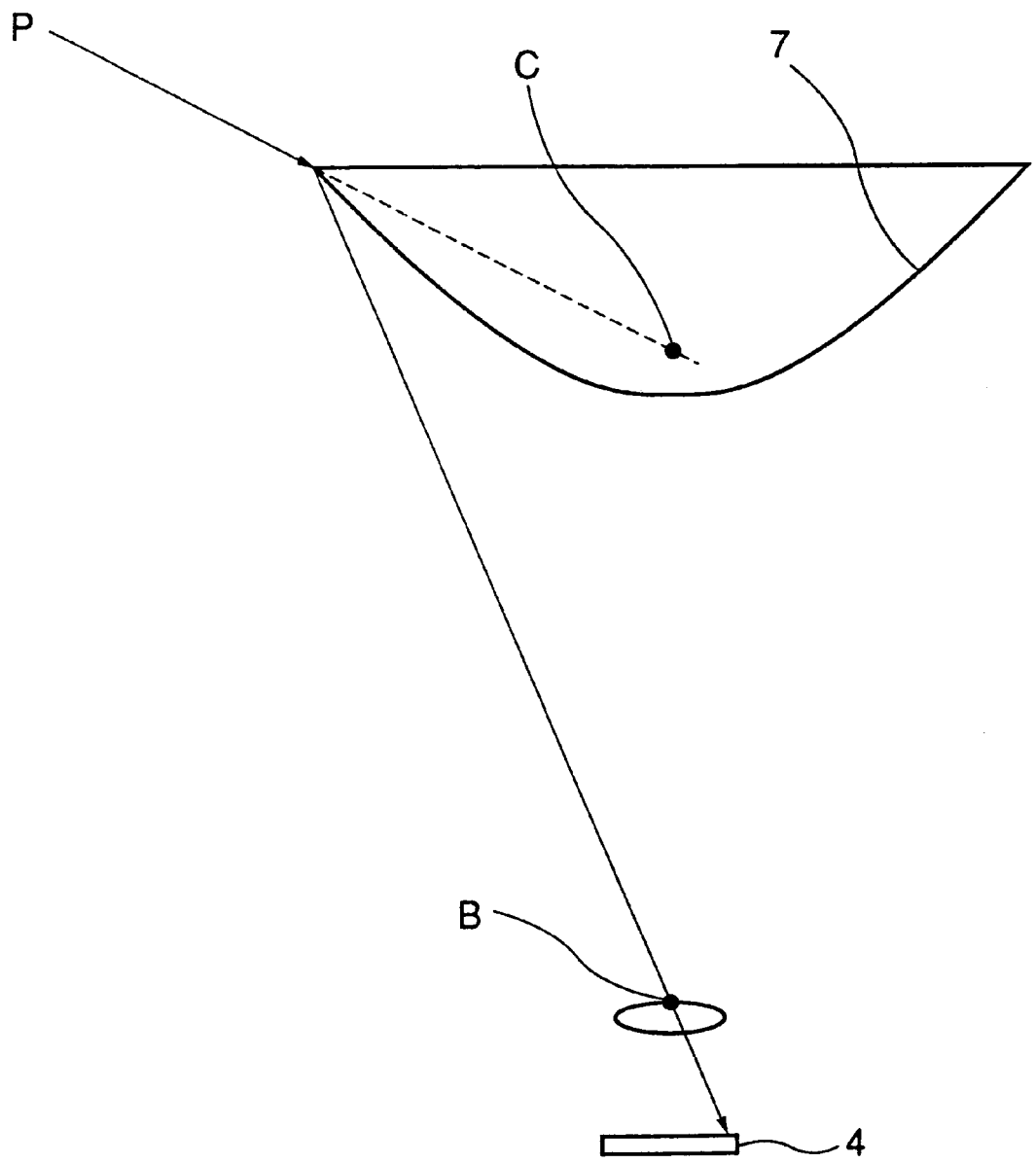
FIG. 1 illustrates a conventional optical system employing a hyperboloidal mirror.
Figure 2:
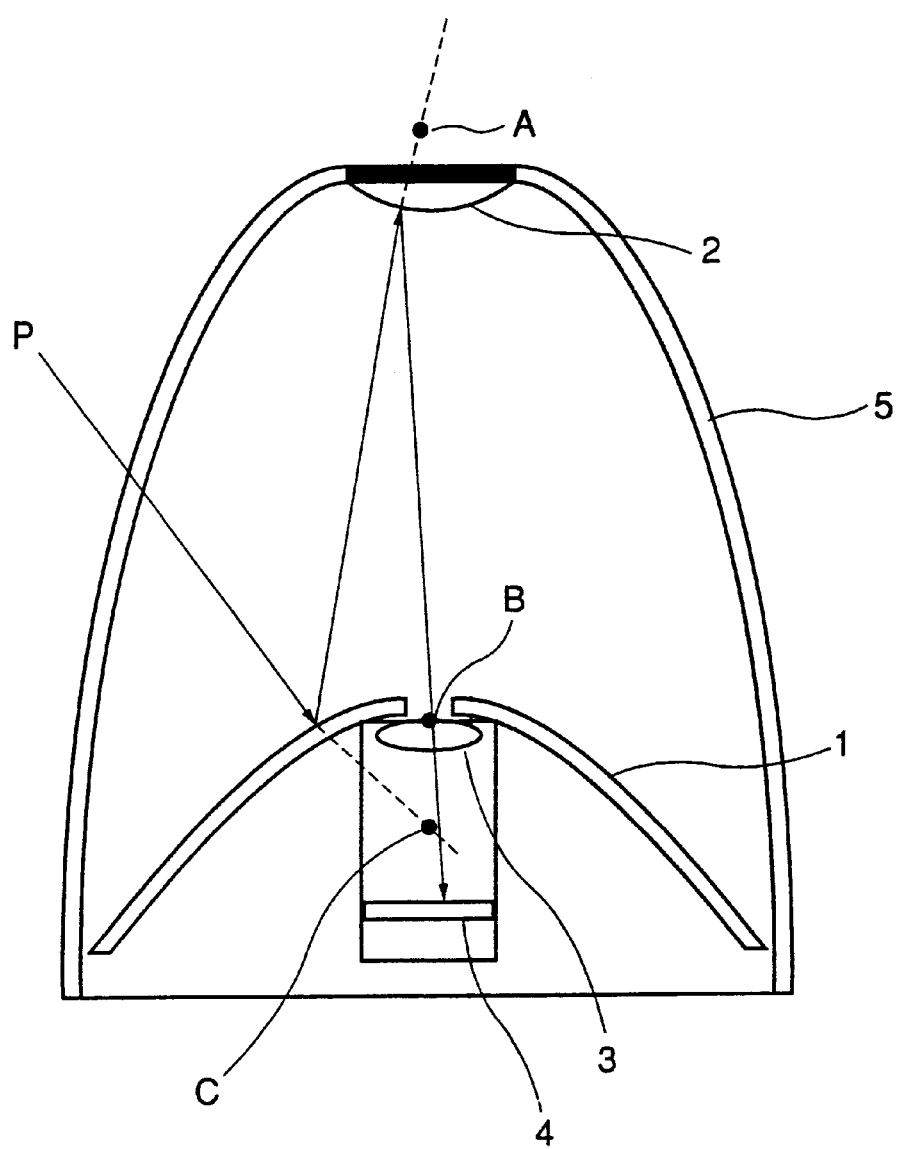
FIG. 2 illustrates an optical system employing two hyperboloidal mirrors.

Referring to FIG. 2, an omnidirectional visual sensor according to an embodiment of the present invention includes a primary mirror 1 formed by a hyperboloidal convex mirror, a secondary mirror 2 formed by a hyperboloidal convex mirror, an image acquisition optical system formed by a photoreceiving lens system 3 and an image acquisition surface 4 and a transparent tube 5.

Referring to FIG. 2, the image acquisition optical system formed by the photoreceiving lens system 3 and the image acquisition surface 4 such as a general telecamera acquires a virtual image formed by the secondary mirror 2 of a hyperboloidal convex mirror through the primary mirror 1 formed by a hyperboloidal convex mirror. The axes of the primary mirror 1 and the secondary mirror 2 are arranged on the same axial line to align a focal point A of the primary mirror 1 with that of the secondary mirror 2 while setting the primary point B of the photoreceiving lens system 3 forming the image acquisition optical system on another focal point of the secondary mirror 2. This arrangement enables perspective coordinate transformation centering on another focal point C of the primary mirror 1. The transparent tube 5 such as a cylindrical glass tube or a semispherical acrylic tube couples the primary mirror 1 and the secondary mirror 2 with each other.

The aforementioned omnidirectional visual sensor adjusts the curvatures of the primary mirror 1 and the secondary mirror 2, thereby performing adjustment for imaging on the image acquisition surface 4. Thus, the omnidirectional visual sensor can transform a central projection, and is easy to minimize.

In the omnidirectional visual sensor according to the embodiment shown in FIG. 2, the secondary mirror 2 may have a spherical or elliptic shape.

Figure 3:
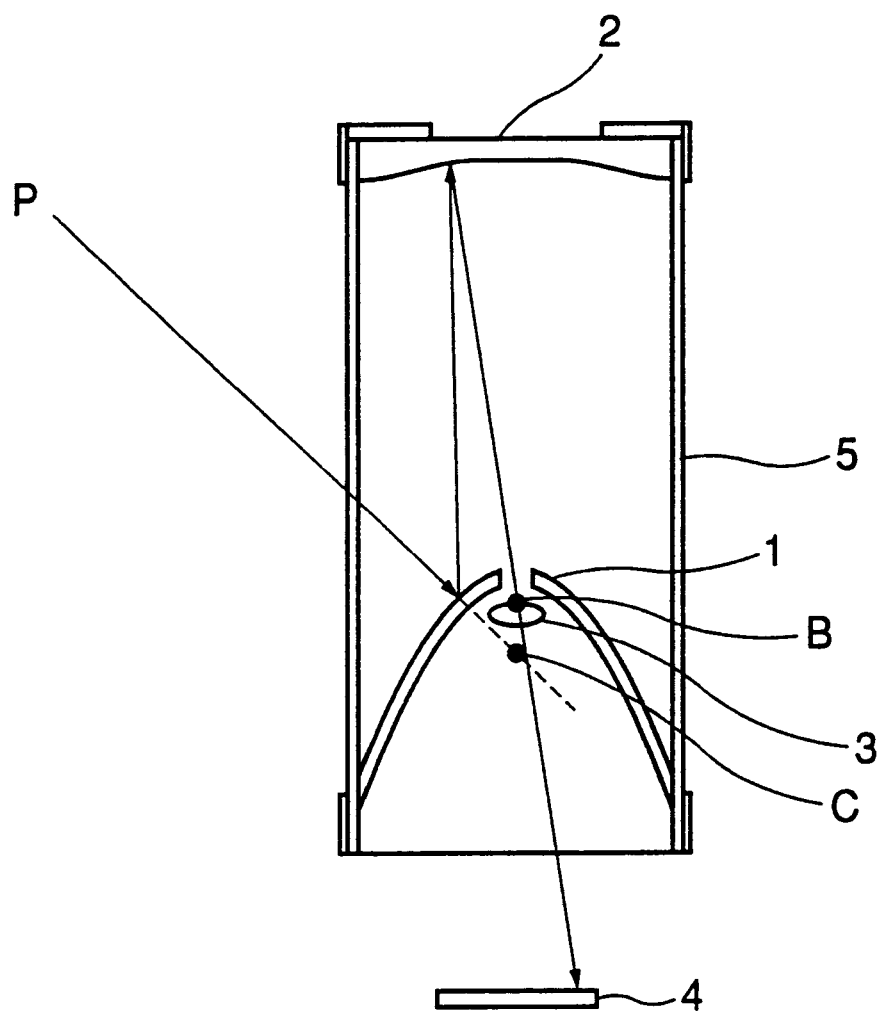
FIG. 3 illustrates an optical system employing two paraboloidal mirrors.

While the omnidirectional visual sensor shown in FIG. 2 employs hyperboloidal convex mirrors, an omnidirectional visual sensor according to another embodiment shown in FIG. 3 employs paraboloidal mirrors. An image acquisition optical system formed by a photoreceiving lens system 3 and an image acquisition surface 4 such as a general telecamera acquires a virtual image formed by a secondary mirror 2 of a parabolic concave mirror through a primary mirror 1 formed by a parabolic convex mirror. The principal point B of the lens system of the camera is set on the focal position of the secondary mirror 2, so that the secondary mirror 2 can image light incident in parallel. Light reflected by the primary mirror 1 enters the secondary mirror 2 in parallel with the axis of the mirror. Thus, the omnidirectional visual sensor enables perspective coordinate transformation centering on the focal point C of the primary mirror 1.

The aforementioned omnidirectional visual sensor adjusts the curvatures of the primary mirror 1 and the secondary mirror 2, thereby performing adjustment for imaging on the image acquisition surface 4. Thus, the omnidirectional visual sensor can correctly transform a central projection and is easy to minimize.

Figure 4:
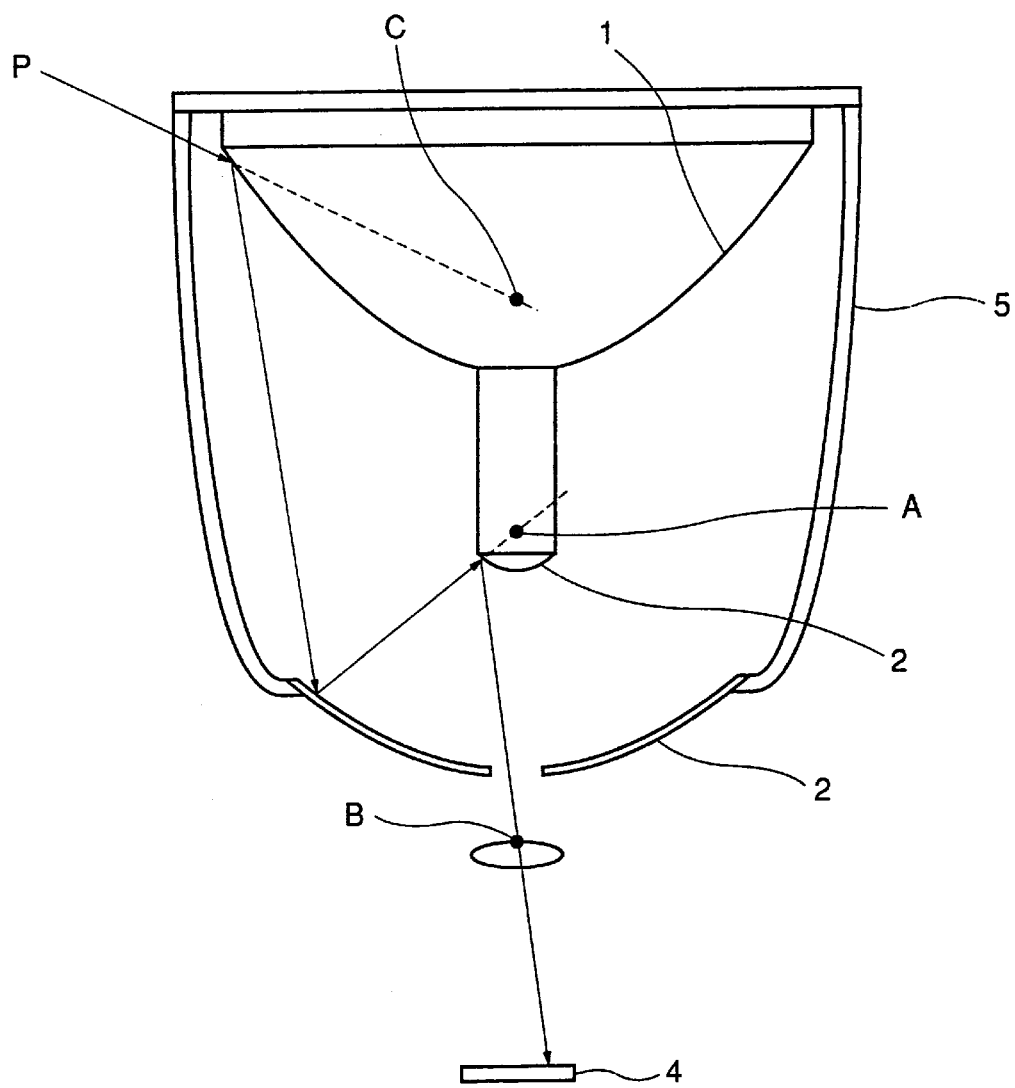
FIG. 4 illustrates an optical system employing three mirrors with surfaces of revolutions.

While each of the omnidirectional visual sensors according to the aforementioned embodiments utilizes two mirrors, i.e., the primary mirror 1 and the secondary mirror 2, an omnidirectional visual sensor according to still another embodiment shown in FIG. 4 utilizes three mirrors (a primary mirror 1 and two secondary mirrors 2). When the focal points can be coupled between the continuous mirrors, perspective coordinate transformation centering on the focal point C of the primary mirror 1 is finally enabled. Also when employing four or more mirrors, perspective coordinate transformation centering on the focal point of the primary mirror is finally enabled.

Figure 5:
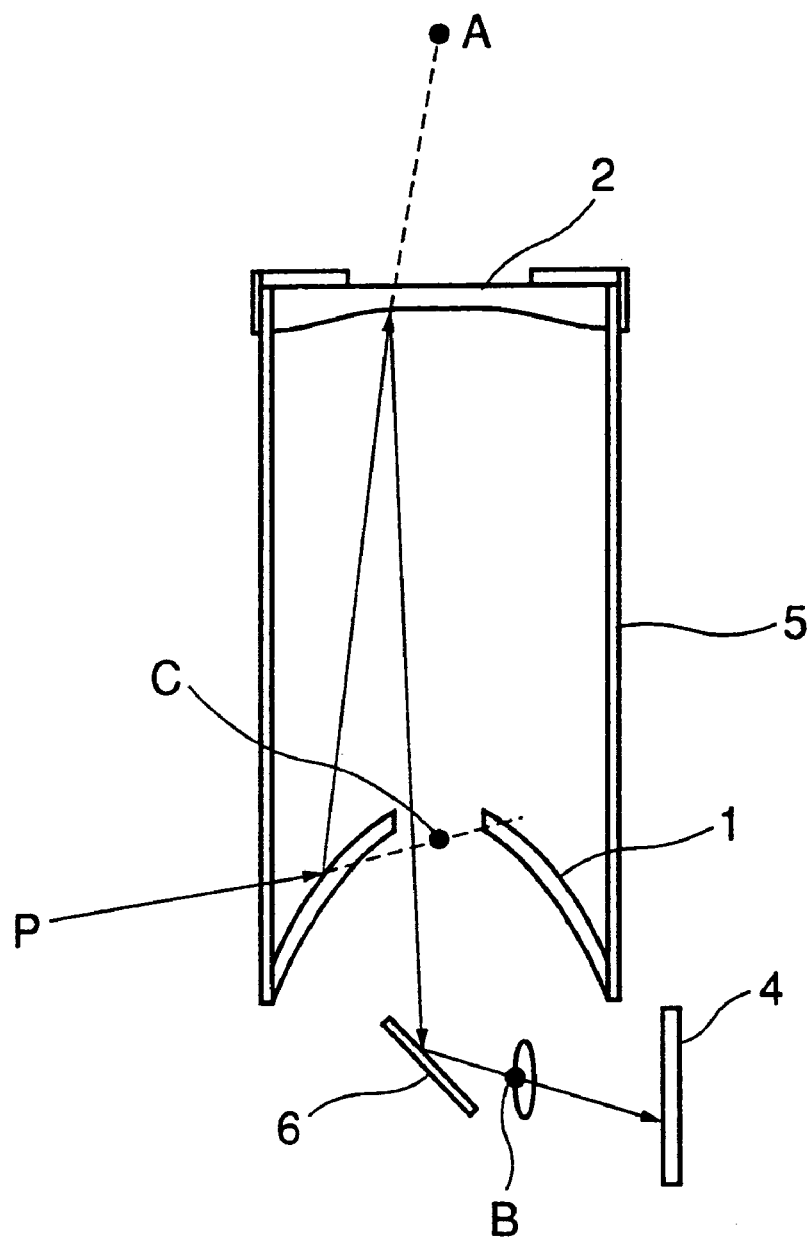
FIG. 5 illustrates an optical system having an optical path bent by a plane mirror.

In an omnidirectional visual sensor according to a further embodiment shown in FIG. 5, a plane mirror 6 is arranged between a secondary mirror 2 and an image acquisition optical lens system to bend an optical path. The plane mirror 6 may be arranged on any position, to finally enable perspective coordinate transformation centering on the focal point C of a primary mirror 1.

Figure 6:
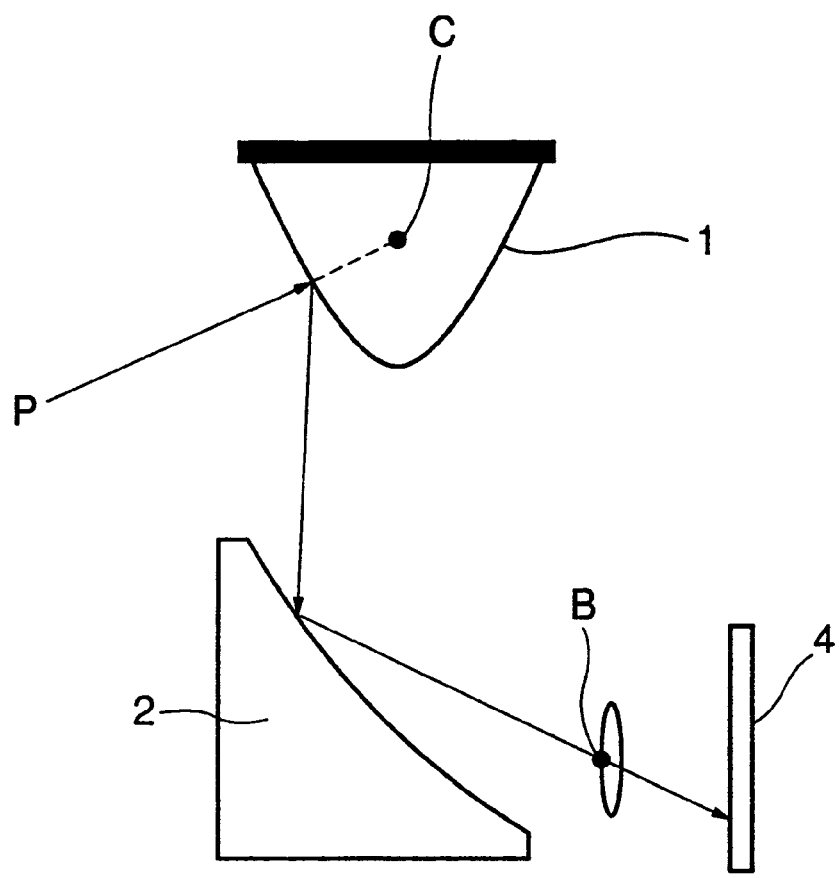
FIG. 6 illustrates an optical system having an optical path bent through an off-axial mirror with a surface of revolution.

FIG. 6 shows an omnidirectional visual sensor according to a further embodiment of the present invention. Referring to FIG. 6, a secondary mirror 2 is formed by an off-axial paraboloidal mirror. Also when employing an off-axial reflecting mirror for the secondary mirror 2, perspective coordinate transformation centering on the focal point C of a primary mirror 1 is finally enabled similarly to the aforementioned embodiments.

The omnidirectional visual sensor according to the present invention having the aforementioned structure attains the following effects:

An input image can be finally transformed into a coordinate system centering on the focal point of the primary mirror.

Further, the omnidirectional visual sensor can be minimized while maintaining an imaging system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An omnidirectional visual sensor including:

a convex mirror with a surface of revolution having a focal point;

a plurality of mirrors with surfaces of revolutions having at least one focal point;

a photoreceiving lens system receiving light reflected by said convex mirror with the surface of revolution and said plurality of mirrors with surfaces of revolutions; and an image acquisition surface receiving said light received by said photoreceiving lens system and converting the same to an electric signal, wherein said convex mirror with the surface of revolution and said plurality of mirrors with surfaces of revolutions are so arranged that the focal point of a first mirror included in said convex mirror with the surface of revolution and said plurality of mirrors with surfaces of revolutions aligns at the same point with the focal point of a second mirror included in said convex mirror with the surface of revolution and said plurality of mirrors with surfaces of revolutions, further reflecting light reflected by said first mirror.

2. The omnidirectional visual sensor in accordance with claim 1, wherein a mirror with a surface of revolution, among said plurality of mirrors with surfaces of revolutions, reflecting light to said photoreceiving lens system has a first focal point on the side of said photoreceiving lens system and is so arranged that said first focal point aligns with the principal point of said photoreceiving lens system.

3. An omnidirectional visual sensor including:

a convex mirror with a surface of revolution having a focal point;

a plurality of mirrors with surfaces of revolutions having at least one focal point;

a photoreceiving lens system receiving light reflected by said convex mirror with the surface of revolution and said plurality of mirrors with surfaces of revolutions; and an image acquisition surface receiving said light received by said photoreceiving lens system and converting the same to an electric signal, wherein said convex mirror with the surface of revolution and said plurality of mirrors with surfaces of revolutions are so arranged that:

a first mirror having only one focal point included in said convex mirror with the surface of revolution and said plurality of mirrors with surfaces of revolutions has said focal point on the side opposite to the reflecting surface of said first mirror, a second mirror, included in said convex mirror with the surface of revolution and said plurality of mirrors with surfaces of revolutions, having only one focal point and further reflecting light reflected by said first mirror has said focal point on the side of the reflecting surface of said second mirror, and the rotation axis of said first mirror aligns with that of said second mirror.

4. The omnidirectional visual sensor in accordance with claim 3, wherein a mirror with a surface of revolution, among said plurality of mirrors with surfaces of revolutions, reflecting light to said photoreceiving lens system has a first focal point on the side of said photoreceiving lens system and is so arranged that said first focal point aligns with the principal point of said photoreceiving lens system.

* * * * *